United States Patent
Sugimoto

(10) Patent No.: US 10,347,196 B2
(45) Date of Patent: Jul. 9, 2019

(54) PORTABLE TERMINAL, PROGRAM THEREFOR, APPARATUS, AND OPERATION DISPLAY SYSTEM

(71) Applicant: Konica Minolta, Inc., Tokyo (JP)

(72) Inventor: Yasuaki Sugimoto, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/795,845

(22) Filed: Jul. 9, 2015

(65) Prior Publication Data

US 2016/0054847 A1 Feb. 25, 2016

(30) Foreign Application Priority Data

Aug. 19, 2014 (JP) ................................ 2014-166761

(51) Int. Cl.
*G06F 3/041* (2006.01)
*G06F 3/0354* (2013.01)
(Continued)

(52) U.S. Cl.
CPC .............. *G09G 3/36* (2013.01); *G06F 3/0346* (2013.01); *G06F 3/0488* (2013.01); *G08C 17/00* (2013.01);
(Continued)

(58) Field of Classification Search
CPC .............. G06F 3/1454; H04N 1/00307; H04N 2201/0094; H04N 5/23293; H04N 5/765; H04N 5/232; H04N 5/23206; H04N 7/181; H04N 13/239; H04N 21/4307; H04N 2201/0084; H04N 2201/0027; H04N 2201/0036; H04N 2201/0039;
(Continued)

(56) References Cited

U.S. PATENT DOCUMENTS

| | | | |
|---|---|---|---|
| 9,277,069 B2 * | 3/2016 | Shigenobu | ......... H04N 1/00477 |
| 2010/0188695 A1 * | 7/2010 | Okigami | ............ H04M 1/7253 |
| | | | 358/1.15 |

(Continued)

FOREIGN PATENT DOCUMENTS

| | | |
|---|---|---|
| CN | 102348029 | 2/2012 |
| CN | 102404482 | 4/2012 |

(Continued)

OTHER PUBLICATIONS

Notice of Reasons for Rejection dated Oct. 31, 2016 for Japanese Patent Application No. 2014-166761 and its English translation; 12 pages.

(Continued)

*Primary Examiner* — Dong Hui Liang
(74) *Attorney, Agent, or Firm* — Squire Patton Boggs (US) LLP

(57) ABSTRACT

A portable terminal includes: a display unit; an operating unit; a detecting unit configured to detect a position of the terminal; and a display changing unit configured to change a screen displayed on the display unit of the terminal to a screen displayed on an operating panel of a predetermined other apparatus, when the display changing unit detects that the position of the terminal detected by the detecting unit and a position of the predetermined other apparatus have a predetermined positional relationship.

11 Claims, 10 Drawing Sheets

(51) Int. Cl.
| | |
|---|---|
| *G06F 3/0488* | (2013.01) |
| *H04N 5/232* | (2006.01) |
| *H04N 5/225* | (2006.01) |
| *G09G 3/36* | (2006.01) |
| *G08C 17/00* | (2006.01) |
| *G06F 3/0346* | (2013.01) |
| *G06F 3/14* | (2006.01) |

(52) U.S. Cl.
CPC .... *G06F 3/1454* (2013.01); *G06F 2200/1637* (2013.01); *G08C 2201/91* (2013.01); *G09G 2356/00* (2013.01)

(58) Field of Classification Search
CPC ... H04N 2201/0041; H04N 2201/0043; H04N 2201/0074; H04N 2201/0075; H04N 1/00247; H04N 1/00251; H04N 1/00305; H04N 1/00318; H04N 1/00347; H04W 4/80; H04W 4/025; H04W 4/023; H04M 1/7253; H04M 1/72527; H04M 2250/22
See application file for complete search history.

(56) References Cited

U.S. PATENT DOCUMENTS

| | | | | |
|---|---|---|---|---|
| 2011/0295502 A1* | 12/2011 | Faenger | .............. | H04M 1/7253 701/431 |
| 2012/0019858 A1* | 1/2012 | Sato | ................... | H04N 1/00344 358/1.15 |
| 2012/0075485 A1* | 3/2012 | Mizutani | ............. | H04M 1/7253 348/207.1 |
| 2013/0115879 A1* | 5/2013 | Wilson | ................ | H04M 1/7253 455/41.1 |
| 2014/0089487 A1* | 3/2014 | Debate | .................. | H04L 67/025 709/223 |
| 2014/0218765 A1* | 8/2014 | Sawayanagi | ....... | H04N 1/00111 358/1.15 |
| 2015/0062629 A1* | 3/2015 | Tamura | .............. | H04N 1/00307 358/1.15 |
| 2015/0212780 A1* | 7/2015 | Nanjo | ................... | G06F 3/1292 358/1.15 |
| 2015/0227820 A1* | 8/2015 | Dupre | .................. | G06K 15/005 358/1.15 |
| 2015/0236922 A1* | 8/2015 | Xiong | ..................... | H04L 41/22 715/748 |

FOREIGN PATENT DOCUMENTS

| | | |
|---|---|---|
| JP | 2008-003574 A | 1/2008 |
| JP | 2011-221908 | 11/2011 |
| JP | 2011-221908 A | 11/2011 |
| JP | 2012-029164 A | 2/2012 |
| JP | 2012-061669 A | 3/2012 |
| JP | 2012-160898 | 8/2012 |
| JP | 2012-217126 A | 11/2012 |
| JP | 2014-016941 | 1/2014 |
| JP | 2014-016941 A | 1/2014 |

OTHER PUBLICATIONS

Office Action dated Feb. 3, 2019 in Chinese Patent Application No. 201510505404.0, 36 pages.

* cited by examiner

PORTABLE TERMINAL, PROGRAM THEREFOR, APPARATUS, AND OPERATION DISPLAY SYSTEM

The entire disclosure of Japanese Patent Application No. 2014-166761 filed on Aug. 19, 2014 including description, claims, drawings, and abstract are incorporated herein by reference in its entirety.

BACKGROUND OF THE INVENTION

Field of the Invention

The present invention relates to a portable terminal, a program therefor, an apparatus, and an operation display system that are capable of changing a screen displayed on the portable terminal to a screen displayed on another apparatus.

Description of the Related Art

There is a technique in which an operating panel included in an image forming apparatus, such as a multifunction peripheral, and a user's portable terminal which is apposed to the operating panel are allowed to operate in conjunction with each other and the apposed portable terminal displays a portion of a screen displaying, for example, an address book that cannot be displayed all at once on the operating panel of the image forming apparatus (see JP 2013-088506 A).

There is a demand for the use of the portable terminal instead of the operating panel of the image forming apparatus. The above-described conjunction operation is performed, for example, to extend the screen of the operating panel and thus cannot handle the above-described demand.

In addition, to use the portable terminal instead of the operating panel of the image forming apparatus, the screen displayed on a display unit of the portable terminal needs to be changed from a screen of the portable terminal (e.g., a screen where a web page is browsed) to a screen displayed on the operating panel of the image forming apparatus. If an instruction for this change is received by a method of allowing a user to press a specific operating button, then a change operation becomes troublesome.

SUMMARY OF THE INVENTION

The present invention has been made to solve the above-described problem, and an object of the present invention is to provide a portable terminal, a program therefor, an operation display apparatus, and an operation display system that are capable of easily changing a screen displayed on the portable terminal to a screen displayed on an operating panel of another apparatus.

The following items of the invention present a summary of the present invention made to attain the object.

[1] To achieve the abovementioned object, according to an aspect, a portable terminal reflecting one aspect of the present invention comprises: a display unit; an operating unit; a detecting unit configured to detect a position of the terminal; and a display changing unit configured to change a screen displayed on the display unit of the terminal to a screen displayed on an operating panel of a predetermined other apparatus, when the display changing unit detects that the position of the terminal detected by the detecting unit and a position of the predetermined other apparatus have a predetermined positional relationship.

In the above-described invention of Item. 1 and following inventions of Items. 12 and 21, when it is detected that the position of the predetermined other apparatus and the position of the portable terminal have the predetermined positional relationship, a screen displayed on the display unit of the portable terminal is changed to a screen displayed on the operating panel of the predetermined other apparatus. A user can change the display by moving the portable terminal held with his/her hand to, for example, get close to the other apparatus or allow the orientation of the display unit to coincide with the orientation of the operating panel of the other apparatus. In addition, since a screen displayed on the operating panel of the other apparatus is displayed as it is on the portable terminal, the portable terminal can be used as a remote operating panel which takes the place of the operating panel of the other apparatus.

[2] The portable terminal of Item. 1, wherein the display changing unit preferably changes the screen when the display changing unit detects that the predetermined positional relationship is maintained for a certain period of time.

[3] The portable terminal of Item. 1 or 2, wherein, when the display changing unit detects the predetermined positional relationship, the display changing unit preferably checks with a user whether to change the screen, and changes the screen when the display changing unit receives an instruction to change the screen.

[4] The portable terminal of any one of Items. 1 to 3, preferably further comprising an invalidation instructing unit configured to instruct the predetermined other apparatus to invalidate acceptance of an operation on the operating panel while the screen displayed on the operating panel of the predetermined other apparatus is displayed on the display unit of the terminal.

In the above-described inventions of Items. 2, 3, 4 and following inventions of Items. 15 and 24, operations on the operating panel of the other apparatus are invalidated while a screen displayed on the display unit of the portable terminal is changed to a screen displayed on the operating panel of the other apparatus.

[5] The portable terminal of any one of Items. 1 to 4, wherein the predetermined positional relationship is preferably such that a distance from the terminal to the operating panel of the predetermined other apparatus is within a predetermined distance.

In the above-described invention of Item. 5 and following inventions of Items. 16 and 25, when the distance between the portable terminal and the other apparatus becomes within the predetermined distance, a screen displayed on the display unit of the portable terminal is changed to a screen displayed on the operating panel of the other apparatus.

[6] The portable terminal of any one of Items. 1 to 4, wherein the predetermined positional relationship is preferably such that a distance from the terminal to the operating panel of the predetermined other apparatus is shorter than a distance obtained before.

In the above-described invention of Item. 6 and following inventions of Items. 17 and 26, regardless of the magnitude of the distance between the portable terminal and the other apparatus, when the portable terminal is brought close to the other apparatus, a screen displayed on the display unit of the portable terminal is changed to a screen displayed on the operating panel of the other apparatus.

[7] The portable terminal of any one of Items. 1 to 4, wherein the predetermined positional relationship is preferably such that an orientation of the display unit is same as an orientation of the operating panel of the predetermined other apparatus.

In the above-described invention of Item. 7 and following inventions of Items. 18 and 27, when the orientation of the display unit of the portable terminal and the orientation of the operating panel of the other apparatus coincide with each other, a screen displayed on the display unit of the portable terminal is changed to a screen displayed on the operating panel of the other apparatus.

[8] The portable terminal of any one of Items. 1 to 4, preferably further comprising a camera configured to take a photograph in a direction in which a back side of the display unit faces, wherein the predetermined positional relationship is preferably such that the predetermined other apparatus is caught in a photographed image output from the camera.

In the above-described invention of Item. 8 and following invention of Item. 28, when the other apparatus is caught in a photographed image output from the camera of the portable terminal, a screen displayed on the display unit of the portable terminal is changed to a screen displayed on the operating panel of the other apparatus. The camera takes a photograph in a direction in which the backside of the display unit of the portable terminal faces. Namely, the camera takes a photograph in the same direction as that of the line of sight the user viewing the display unit of the portable terminal. Therefore, when the other apparatus is present straight ahead of the line of sight of the user viewing the display unit of the portable terminal, a screen displayed on the display unit of the portable terminal is changed to a screen displayed on the operating panel of the other apparatus.

[9] The portable terminal of any one of Items. 1 to 4, wherein the predetermined positional relationship is preferably such that the terminal and the predetermined other apparatus can perform wireless communication with each other.

[10] The portable terminal of any one of Items. 1 to 9, wherein, when there are a plurality of predetermined other apparatuses that satisfy the predetermined positional relationship, an operation of selecting one of the plurality of predetermined other apparatuses is preferably accepted, and the screen displayed on the display unit of the terminal is preferably changed to a screen displayed on an operating panel of the apparatus selected by the operation.

In the above-described inventions of Items. 9 and 10 and following invention of Item. 31, when there are a plurality of other apparatuses that satisfy the predetermined positional relationship, the user is allowed to select one of the plurality of other apparatuses and a display change is performed targeting the selected apparatus. For example, there are a plurality of other apparatuses that satisfy the predetermined positional relationship in the case in which a plurality of other apparatuses are caught in an image photographed by the camera of the portable terminal or the case in which, when the portable terminal is brought close to a certain apparatus, another apparatus is placed on an extension of a direction in which the portable terminal is brought close to the certain apparatus.

[11] A non-transitory recording medium storing a computer readable program for causing an information processing apparatus to function as a portable terminal of anyone of Items. 1 to 10.

[12] To achieve the abovementioned object, according to an aspect, an apparatus reflecting one aspect of the present invention comprises: an operating panel; a detecting unit configured to detect a position of a predetermined portable terminal; and a change instructing unit configured to instruct the portable terminal to change a screen displayed on a display unit of the portable terminal to a same screen as a screen displayed on the operating panel, when the change instructing unit detects that the position of the portable terminal detected by the detecting unit and a position of the apparatus have a predetermined positional relationship.

[13] The apparatus of Item. 12, wherein the change instructing unit preferably instructs to change the screen when the display changing unit detects that the predetermined positional relationship is maintained for a certain period of time.

[14] The apparatus of Item. 12 or 13, wherein, when the change instructing unit detects the predetermined positional relationship, the change instructing unit preferably checks with a user whether to change the screen, and instructs the portable terminal to change the screen when the change instructing unit receives an instruction to change the screen.

[15] The apparatus of any one of Items. 12 to 14, wherein acceptance of an operation on the operating panel is preferably invalidated while the change is instructed.

[16] The apparatus of any one of Items. 12 to 15, wherein the predetermined positional relationship is preferably such that a distance from the apparatus to the portable terminal is within a predetermined distance.

[17] The apparatus of any one of Items. 12 to 15, wherein the predetermined positional relationship is preferably such that a distance from the apparatus to the portable terminal is shorter than a distance obtained before.

[18] The apparatus of any one of Items. 12 to 15, wherein the predetermined positional relationship is preferably such that an orientation of the operating panel is same as an orientation of the display unit of the portable terminal.

[19] The apparatus of any one of Items. 12 to 15, preferably further comprising a camera configured to take a photograph of a predetermined range around the apparatus, wherein the predetermined positional relationship is preferably such that the portable terminal is caught in a photographed image output from the camera.

In the above-described inventions of Items. 11 to 19 and following invention of Item. 29, when the portable terminal is present within a predetermined range around the apparatus, a screen displayed on the display unit of the portable terminal is changed to a screen displayed on the operating panel of the apparatus.

[20] The apparatus of any one of Items. 12 to 15, wherein the predetermined positional relationship is preferably such that the apparatus and the portable terminal can perform wireless communication with each other.

[21] To achieve the abovementioned object, according to an aspect, an operation display system including a portable terminal and an apparatus including an operating panel, the system reflecting one aspect of the present invention comprises: a detecting unit configured to detect a position of the portable terminal relative to the apparatus; and a display changing unit configured to change a screen displayed on a display unit of the portable terminal to a screen displayed on the operating panel of the apparatus when the detecting unit detects that a position of the apparatus and the position of the portable terminal have a predetermined positional relationship.

[22] The operation display system of Item. 21, wherein the display changing unit preferably changes the screen when the display changing unit detects that the predetermined positional relationship is maintained for a certain period of time.

[23] The operation display system of Item. 21 or 22, wherein, when the display changing unit detects the predetermined positional relationship, the display changing unit preferably checks with a user whether to change the screen, and changes the screen when the display changing unit receives an instruction to change the screen.

[24] The operation display system of any one of Items. 21 to 23, wherein acceptance of an operation on the operating panel is preferably invalidated while the screen displayed on the display unit of the portable terminal is changed to a same screen as a screen displayed on the operating panel of the apparatus.

[25] The operation display system of any one of Items. 21 to 24, wherein the predetermined positional relationship is preferably such that a distance from the portable terminal to the apparatus is within a predetermined distance.

[26] The operation display system of any one of Items. 21 to 24, wherein the predetermined positional relationship is preferably such that a distance from the portable terminal to the apparatus is shorter than a distance obtained before.

[27] The operation display system of any one of Items. 21 to 24, wherein the predetermined positional relationship is preferably such that an orientation of the operating panel is same as an orientation of the display unit of the portable terminal.

[28] The operation display system of any one of Items. 21 to 24, wherein the portable terminal preferably includes a camera configured to take a photograph in a direction in which a back side of the display unit of the terminal faces, and the predetermined positional relationship is preferably such that the apparatus is caught in a photographed image output from the camera.

[29] The operation display system of any one of Items. 21 to 24, wherein the apparatus preferably further includes a camera configured to take a photograph of a predetermined range around the apparatus, and the predetermined positional relationship is preferably such that the portable terminal is caught in a photographed image output from the camera.

[30] The operation display system of any one of Items. 21 to 24, wherein the predetermined positional relationship is preferably such that the apparatus and the portable terminal can perform wireless communication with each other.

[31] The operation display system of any one of Items. 21 to 30, wherein, when there are a plurality of apparatuses that satisfy the predetermined positional relationship, an operation of selecting one of the plurality of apparatuses is preferably accepted, and the screen displayed on the display unit of the portable terminal is preferably changed to a screen displayed on an operating panel of the apparatus selected by the operation.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
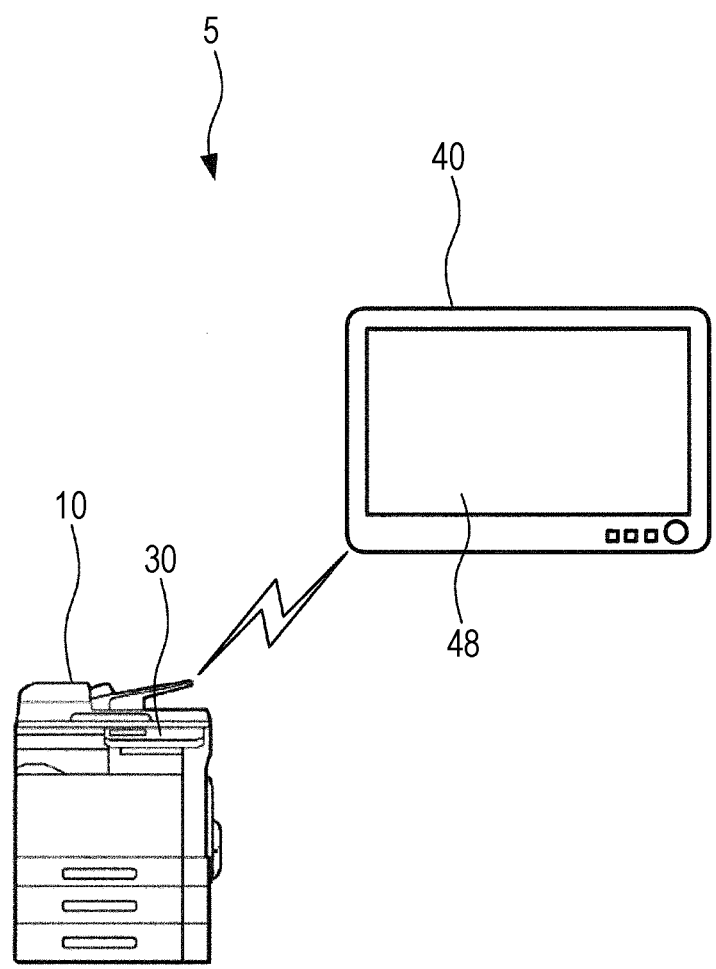
FIG. 1 is a diagram showing an exemplary configuration of an operation display system according to an embodiment of the present invention.

FIG. 1 shows an exemplary configuration of an operation display system 5 according to an embodiment of the present invention. The operation display system 5 includes an image processing apparatus 10 serving as an apparatus including an operating panel 30; and a portable terminal 40 capable of remotely operating the image processing apparatus 10 through wireless communication. The portable terminal 40 is connected to the image processing apparatus 10 by a network such as a Local Area Network (LAN) or near-field communication such that they can perform wireless communication with each other.

The image processing apparatus 10 is a so-called multi-function peripheral (MFP) having, for example, a copy function that optically reads a document and prints a copied image of the document onto recording paper, a scan function that saves image data of a read document as a file or transmits the image data to an external terminal through a network, a printer function that forms an image for print data which is received from a Personal Computer (PC) or the like through a network, on recording paper and prints out the image, and a facsimile function that transmits and receives image data according to a facsimile procedure.

The portable terminal 40 is a portable information processing apparatus such as a tablet. In the operation display system 5, when a user displaces the portable terminal 40 such that the image processing apparatus 10 and the portable terminal 40 have a predetermined positional relationship, a screen displayed on the portable terminal 40 changes to a screen displayed on the operating panel 30 of the image processing apparatus 10, enabling the portable terminal 40 to operate as a remote operating panel of the image processing apparatus 10.

Figure 2:
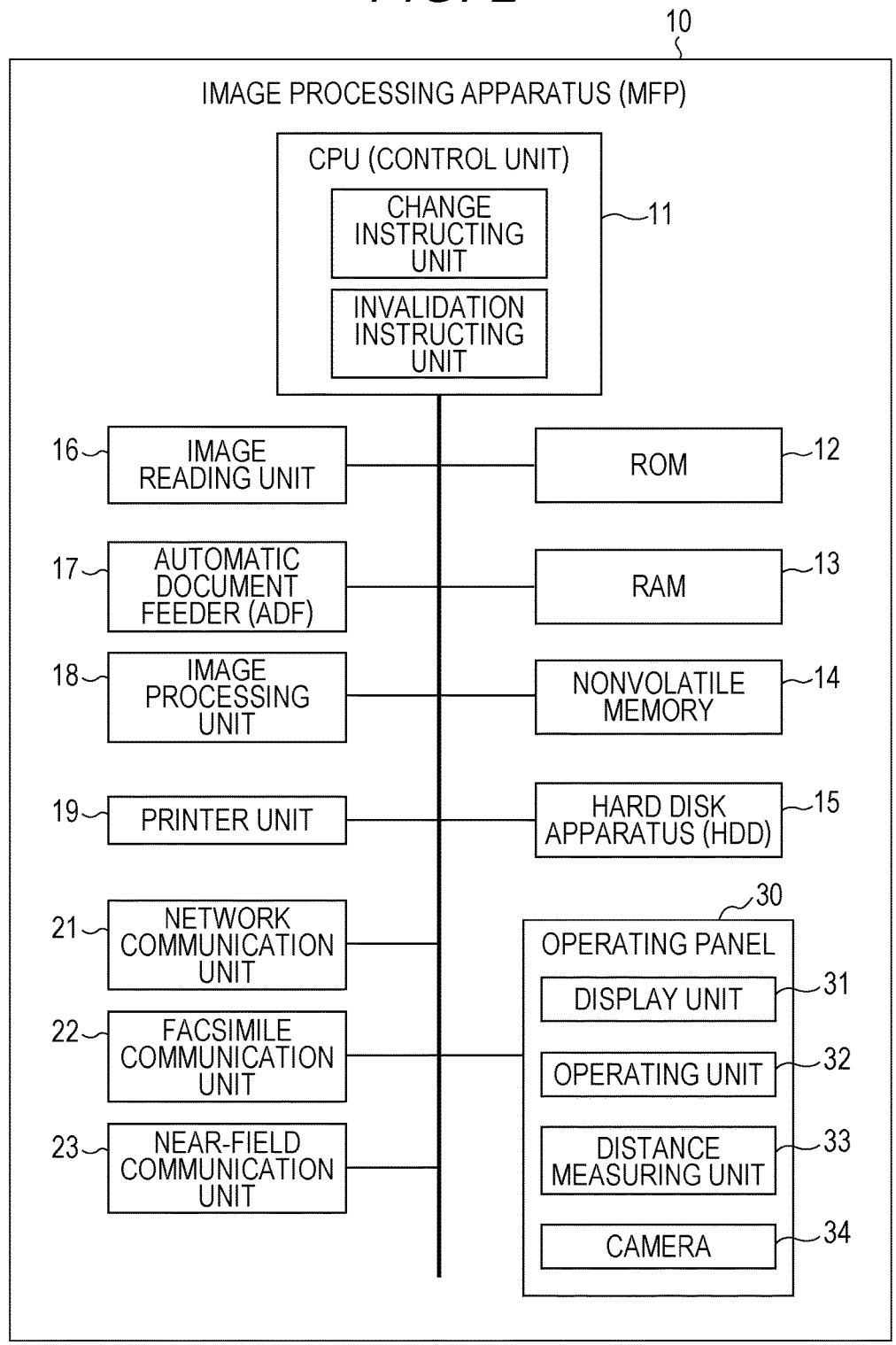
FIG. 2 is a block diagram showing a schematic configuration of an image processing apparatus including an operation display apparatus of the embodiment of the present invention.

FIG. 2 is a block diagram showing a schematic configuration of the image processing apparatus 10. The image processing apparatus 10 includes a Central Processing Unit (CPU) 11 serving as a control unit that performs overall control of the operation of the image processing apparatus 10. To the CPU 11 are connected, through a bus, a Read Only Memory (ROM) 12, a Random Access Memory (RAM) 13, a nonvolatile memory 14, a hard disk apparatus 15, an image reading unit 16, an automatic document feeder (ADF) 17, an image processing unit 18, a printer unit 19, a network communication unit 21, a facsimile communication unit 22, a near-field communication unit 23, the operating panel 30, etc.

The CPU 11 uses an Operating System (OS) program as a base program, and executes middleware, an application program, etc., on the OS program. The ROM 12 stores various types of programs. By the CPU 11 performing various types of processes according to the programs, the functions of the image processing apparatus 10 are implemented. The CPU 11 functions as a change instructing unit that instructs the portable terminal 40 to change a screen, and an invalidation instructing unit that cancels a change of a screen.

The RAM 13 is used as, for example, a working memory that temporarily stores various types of data when the CPU 11 performs processes based on a program, and an image memory that stores image data.

The nonvolatile memory 14 is a memory (flash memory) whose stored content is not destructed even if power is turned off, and is used, for example, to save various types of setting information.

The hard disk apparatus 15 is a large-capacity nonvolatile storage apparatus, and stores various types of programs and data in addition to print data and display screen data.

The image reading unit 16 functions to optically read a document to obtain image data. The image reading unit 16 is configured to include, for example, a light source that irradiates a document with light; a line image sensor that reads the document for one line in a width direction by receiving reflected light of the light; a moving unit that sequentially moves a line-by-line read position in a length direction of the document; an optical path including a lens, a mirror, etc., that guide reflected light from the document to the line image sensor to form an image; and a converting unit that converts an analog image signal output from the line image sensor into digital image data.

The automatic document feeder 17 functions to send out and feed documents set on a document table one by one in turn from the top, and allow the documents to pass through the read position of the image reading unit 16, and then discharge the documents to a predetermined discharge location. The image reading unit 16 has the function of reading a document placed on platen glass and the function of sequentially reading documents fed by the automatic document feeder 17.

The image processing unit 18 performs a rasterization process that converts print data into image data, an image data compression/decompression process, etc., in addition to processes such as zoom-in/out, rotation, etc., of an image.

The printer unit 19 functions to form an image for image data on recording paper. Here, the printer unit 19 is configured as a so-called laser printer that includes a recording paper feeding apparatus, a photoconductor drum, a charging apparatus, a laser unit, a developing apparatus, a transfer/separation apparatus, a cleaning apparatus, and a fusing apparatus, and that performs image formation by an electrophotographic process. Image formation may be performed by other schemes.

The network communication unit 21 functions to communicate with the portable terminal 40, an external PC, a server, etc., through a network such as a LAN.

The facsimile communication unit 22 functions to transmit and receive image data to/from an external apparatus having a facsimile function, through a telephone line.

The near-field communication unit 23 performs near-field communication with an external apparatus such as the portable terminal 40. The communicable distance is, for example, within 10 m.

The operating panel 30 is configured to include a display unit 31, an operating unit 32, a distance measuring unit 33, and a camera 34. The operating panel 30 is controlled by the CPU 11 or a CPU that is separately included in the operating panel 30.

The display unit 31 functions to display various types of operation screens and setting screens, etc. The display unit 31 is configured by a liquid crystal display (LCD), a driver therefor, etc. The operating unit 32 functions to receive various types of operations from the user. The operating unit 32 includes various types of hard switches such as a start button; and a touch panel provided on a display surface of the display unit 31. The touch panel detects a coordinate position where the display surface of the display unit 31 is touch-operated with a touch pen, a finger, etc.

The distance measuring unit 33 measures a distance to the portable terminal 40 that is present within a predetermined distance from the operating panel 30. For a method of measuring the distance, any known method may be used.

The camera 34 takes a photograph of a predetermined range around the image processing apparatus 10. For example, the camera 34 takes a photograph of the front of the image processing apparatus 10 in a range of about 120 degrees in a horizontal direction.

Figure 3:
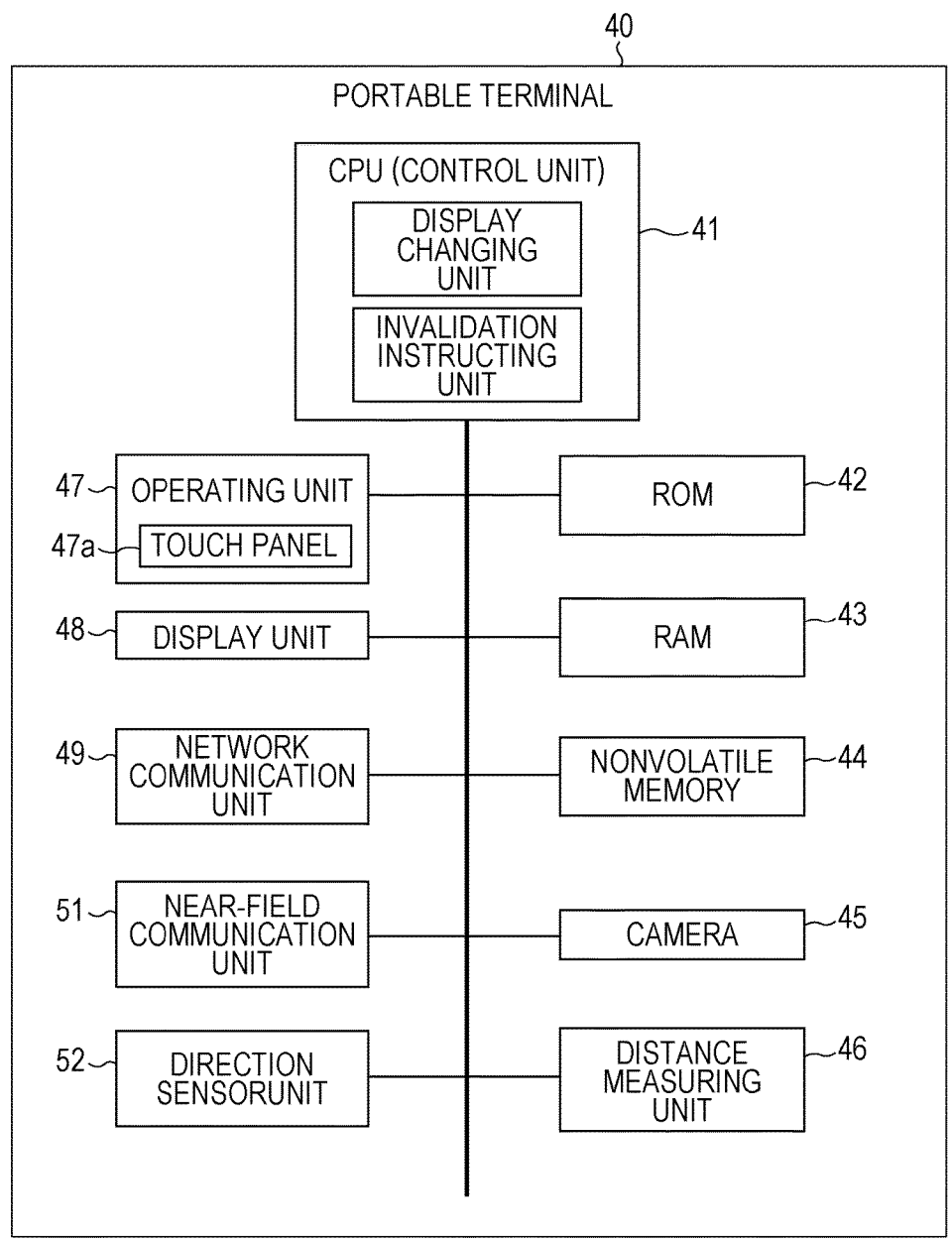
FIG. 3 is a block diagram showing a schematic configuration of a portable terminal.

FIG. 3 is a block diagram showing a schematic configuration of the portable terminal 40. The portable terminal 40 includes a CPU 41 that performs overall control of the operation of the portable terminal 40. To the CPU 41 are connected, through a bus, a ROM 42, a RAM 43, a nonvolatile memory 44, a camera 45, a distance measuring unit 46, an operating unit 47, a display unit 48, a network communication unit 49, a near-field communication unit 51, and a direction sensor unit 52.

The CPU 41 uses an Operating System (OS) program as a base program, and executes middleware, an application program, etc., on the OS program. The ROM 42 stores various types of programs. By the CPU 41 performing various types of processes according to the programs, the functions of the portable terminal 40 are implemented. The CPU 41 functions as a changing unit that changes a screen and an invalidation instructing unit that cancels a change of a screen.

The RAM 43 is used as a working memory for temporarily storing various types of data when the CPU 41 performs processes based on a program, and storing display data.

The nonvolatile memory 44 is a memory (flash memory) whose stored content is not destructed even if power is turned off, and is used, for example, to save various types of setting information.

The display unit 48 functions to display various types of operation screens and setting screens. The display unit 48 is configured by a liquid crystal display, a driver therefor, etc. The operating unit 47 functions to receive various types of operations from an operator. The operating unit 47 includes a small number of hard switches; and a touch panel 47a provided on a display surface of the display unit 48.

The camera 45 takes a photograph in a direction of the line of sight of the user viewing the display unit 48 of the portable terminal 40, i.e., a direction in which the back side of the display unit 48 faces. The portable terminal 40 has a thin-plate form. Almost all of the front side of the portable terminal 40 serves as the display surface of the display unit 48. The camera 45 is outwardly provided on the back side of the portable terminal 40 and takes a photograph in the direction in which the back side of the portable terminal 40 faces.

The distance measuring unit 46 measures a distance to the image processing apparatus 10 that is present within a predetermined distance from the portable terminal 40. For a method of measuring the distance, any known method may be used. Here, the distance measuring unit 46 measures a distance to the image processing apparatus 10 present in the direction in which the camera 45 takes a photograph, i.e., the direction in which the back side of the portable terminal 40 faces.

The network communication unit 49 functions to communicate with the image processing apparatus 10, an external PC, a server, etc. The near-field communication unit 51 performs near-field communication with an external apparatus such as the image processing apparatus 10. The communicable distance is, for example, within 10 m.

The direction sensor unit 52 is configured by, for example, combining a plurality of geomagnetic sensors and a plurality of acceleration sensors. The direction sensor unit 52 detects the position (specifically, posture and angle) of the portable terminal 40. In addition, the direction sensor unit 52 detects, when the portable terminal 40 is tilted or moved, the orientation and speed of the displacement and notifies the CPU 41 of detection results.

Next, the operation of changing a screen displayed on the portable terminal 40 to a screen displayed on the operating panel 30 of the image processing apparatus 10 in the operation display system 5 will be described.

Figure 4:
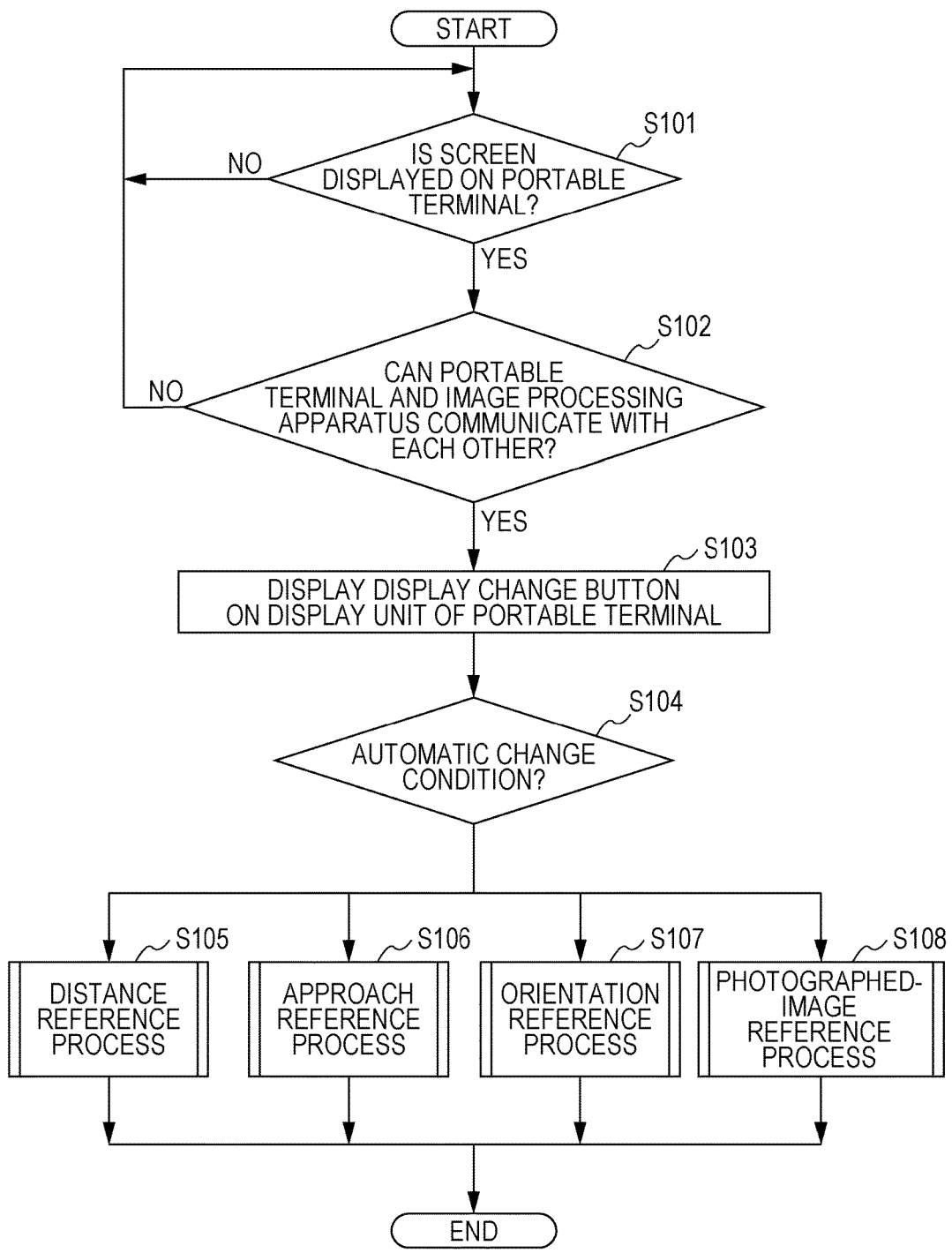
FIG. 4 is a flowchart showing the entire display change process performed by the portable terminal.

FIG. 4 is a flowchart showing a summary of a process related to the above-described change operation. First, it is checked whether a screen of the portable terminal 40 is displayed on the display unit 48 of the portable terminal 40 (step S101). The screen of the portable terminal 40 is a screen other than screens to be displayed on the display unit 31 of the operating panel 30 of the image processing apparatus 10. For example, the screen is a browser screen that displays a web page or a screen displayed by some kind of application program (excluding an application program related to the change operation) which is installed on the portable terminal 40.

If a screen of the portable terminal 40 is not displayed on the portable terminal 40 (step S101: No), processing returns to step S101. If a screen of the portable terminal 40 is displayed on the portable terminal 40 (step S101: Yes), it is determined whether the portable terminal 40 and the image processing apparatus 10 are in a communicable state with each other (step S102). Here, it is determined whether near-field communication can be performed.

If the portable terminal 40 and the image processing apparatus 10 are not in a communicable state with each other (step S102: No), processing returns to step S101. If the portable terminal 40 and the image processing apparatus 10 are in a communicable state with each other (step S102: Yes), a display change button is displayed on the display unit 48 of the portable terminal 40 (step S103). The display change button is an operating button for receiving, from the user, an instruction to change a screen displayed on the display unit 48 of the portable terminal 40 to a screen displayed on the operating panel 30 of the image processing apparatus 10.

Then, a type of a preset automatic change condition is determined (step S104) and a process for the set automatic change condition is automatically performed (step S105, S106, S107, or S108). The automatic change condition includes a distance reference, an approach reference, an orientation reference, and a photographed-image reference. Any one of the references is selected and set in advance.

If the preset automatic change condition is the distance reference, a distance reference process is performed (step S105) and the process ends. If the preset automatic change condition is the approach reference, an approach reference process is performed (step S106) and the process ends. If the preset automatic change condition is the orientation reference, an orientation reference process is performed (step S107) and the process ends. If the preset automatic change condition is the photographed-image reference, a photographed-image reference process is performed (step S108) and the process ends.

Figure 5:
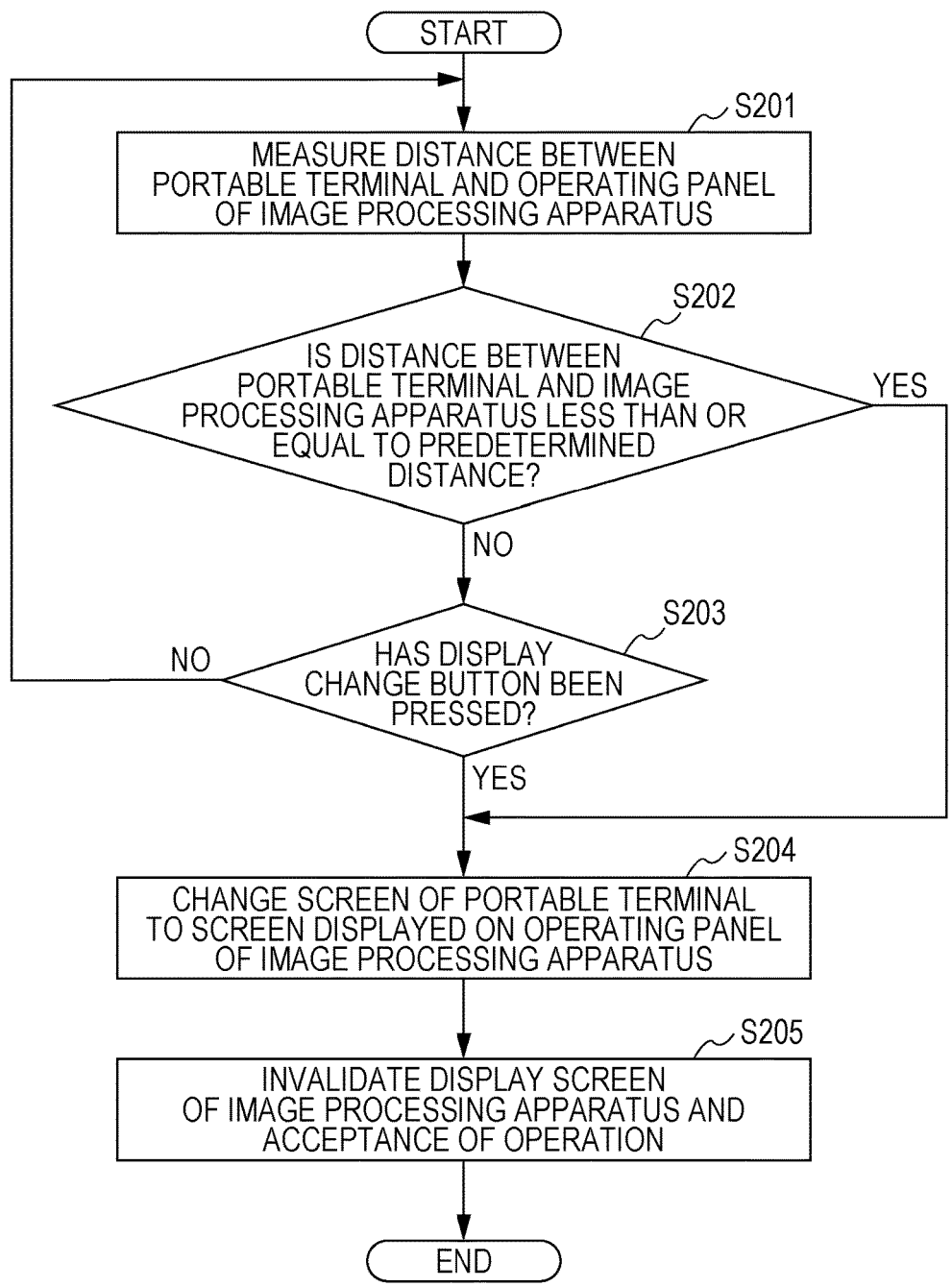
FIG. 5 is a flowchart showing the details of a distance reference process (step S105 of FIG. 4)

FIG. 5 is a flowchart showing the details of the distance reference process (step S105 of FIG. 4). The distance between the portable terminal 40 and the operating panel 30 of the image processing apparatus 10 is measured (step S201). The measurement is performed using the distance measuring unit 46 of the portable terminal 40 or the distance measuring unit 33 of the image processing apparatus 10.

Then, it is determined whether the distance between the portable terminal 40 and the image processing apparatus 10 is less than or equal to a predetermined distance (step S202). The predetermined distance is, for example, set to a short distance such as 50 cm or 1 m.

If the distance between the portable terminal 40 and the image processing apparatus 10 is less than or equal to the predetermined distance (step S202: Yes), processing transitions to step S204. Note that it may be determined to be "Yes" at step S202 when the state of being less than or equal to the predetermined distance is maintained for a certain period of time or more (e.g., two seconds or more). If the distance between the portable terminal 40 and the image processing apparatus 10 is not less than or equal to the predetermined distance (step S202: No), it is determined whether the display change button has been pressed (step S203). If the display change button has not been pressed (step S203: No), processing returns to step S201 and the process continues. If the display change button has been pressed (step S203: Yes), processing transitions to step S204.

At step S204, a screen displayed on the portable terminal 40 is changed to a screen displayed on the display unit 31 of the operating panel 30 of the image processing apparatus 10. Here, the same screen as that displayed on the display unit 31 of the operating panel 30 at the present time is displayed on the display unit 48 of the portable terminal 40.

Then, the display on the display unit 31 of the operating panel 30 of the image processing apparatus 10 and the acceptance of operations by the operating unit 32 are invalidated (step S205) and the process ends. By this, while a screen displayed on the operating panel 30 of the image processing apparatus 10 is displayed on the portable terminal 40, operations on the operating panel 30 of the image processing apparatus 10 are invalidated. Namely, an apparatus that functions to receive various types of operations for the image processing apparatus 10 is changed from the operating panel 30 of the image processing apparatus 10 to the portable terminal 40.

As such, in the case in which the distance reference is set as the automatic change condition, when the user moves the portable terminal 40 such that the portable terminal 40 and the operating panel 30 of the image processing apparatus 10 have a positional relationship where the distance from the portable terminal 40 to the operating panel 30 of the image processing apparatus 10 is within the predetermined distance, a screen displayed on the portable terminal 40 is changed to a screen displayed on the operating panel 30 of the image processing apparatus 10.

Note that, when there are a plurality of image processing apparatuses 10 to which the distances from the portable terminal 40 are less than or equal to the predetermined distance at step S202 of FIG. 5, an operation of selecting one of the plurality of image processing apparatuses 10 is accepted from the user. Then, the processes at steps S204 and S205 are performed targeting the selected image processing apparatus 10.

Figure 6:
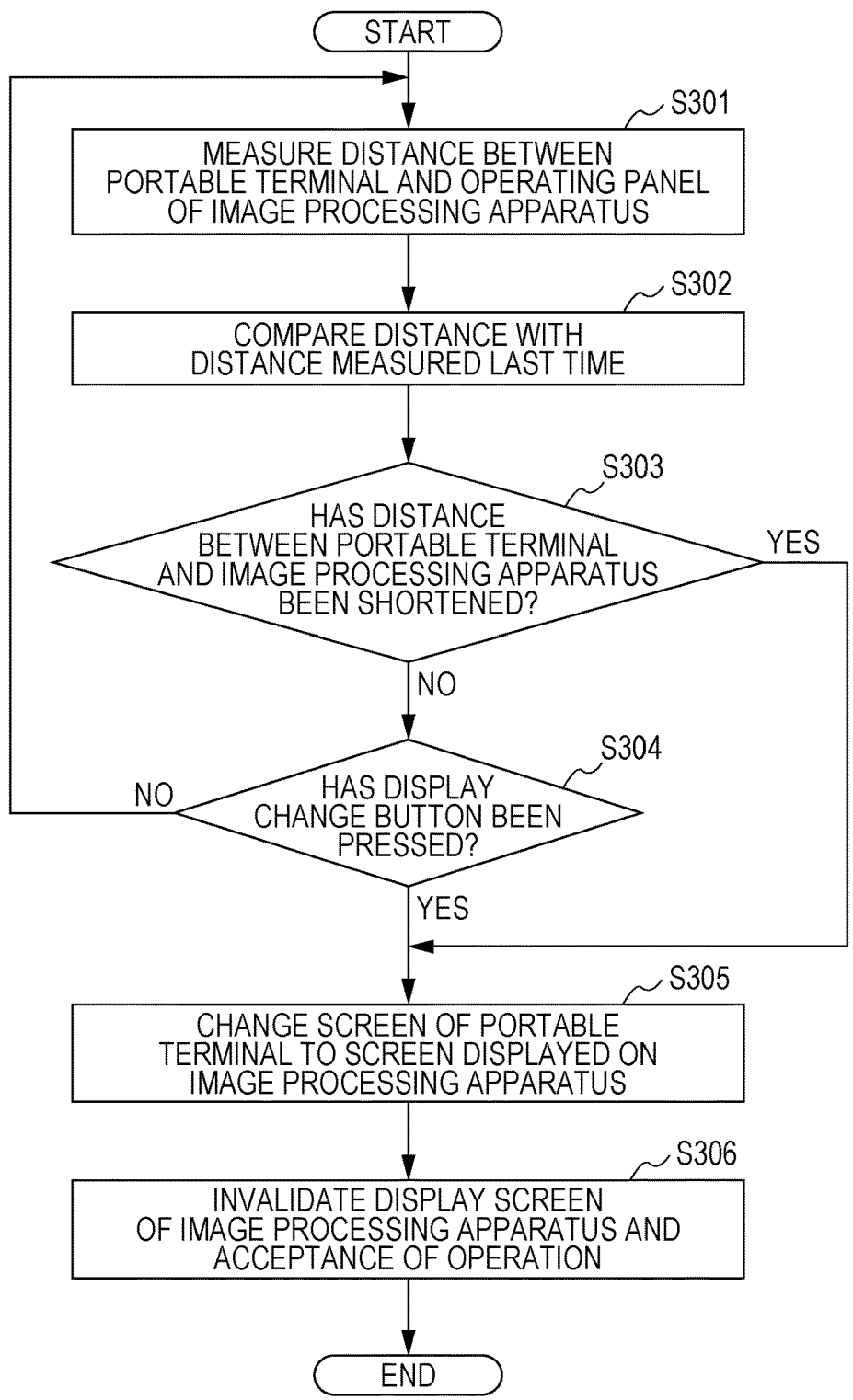
FIG. 6 is a flowchart showing the details of an approach reference process (step S106 of FIG. 4)

FIG. 6 is a flowchart showing the details of the approach reference process (step S106 of FIG. 4). A distance between the portable terminal 40 and the operating panel 30 of the image processing apparatus 10 is measured (step S301). The measurement is performed using the distance measuring unit 46 of the portable terminal 40 or the distance measuring unit 33 of the image processing apparatus 10. The measurement of the distance is performed at a predetermined time interval. Measurement times and measured distances are stored so as to be associated with each other.

Then, the measured distance is compared with a distance measured last time (step S302). If the distance measured this time is shorter than the distance measured last time, i.e., if the portable terminal 40 has brought close to the image processing apparatus 10 (step S303: Yes), processing transitions to step S305. Note that it may be determined to be "Yes" at step S303 when the state of being brought close is maintained for a certain period of time or more, specifically, for example, when the portable terminal 40 is continuously brought close to the image processing apparatus 10 for a certain period of time or more, or when the portable terminal 40 has not been moved away from the image processing apparatus 10 before a certain period of time has elapsed since they are started to be brought close to each other.

This determination is made with reference to whether the portable terminal 40 has got close to the image processing apparatus 10, and thus, the absolute distance between the portable terminal 40 and the image processing apparatus 10 has nothing to do with the determination. Therefore, the determination "Yes" also includes the case in which the user performs the operation of bringing the portable terminal 40 close to the image processing apparatus 10, holding the portable terminal 40 with his/her hand at his/her seat away from the image processing apparatus 10. Note that a range of the distance between the portable terminal 40 and the image processing apparatus 10 where the operation of bringing the portable terminal 40 close to the image processing apparatus 10 is valid may be set, and only when the operation of bringing the portable terminal 40 close to the image processing apparatus 10 is performed within the range, display may be changed. The range of the distance is set to, for example, 3 m or more or 3 m to 10 m.

If the distance measured this time is not shorter than the distance measured last time (step S303: No), i.e., the portable terminal 40 has not been moved to get close to the image processing apparatus 10, it is determined whether the display change button has been pressed (step S304). If the display change button has not been pressed (step S304: No), processing returns to step S301 and the process continues. If the display change button has been pressed (step S304: Yes), processing transitions to step S305.

At step S305, a screen displayed on the portable terminal 40 is changed to a screen displayed on the display unit 31 of the operating panel 30 of the image processing apparatus 10. Here, the same screen as that displayed on the display unit 31 of the operating panel 30 at the present time is displayed on the display unit 48 of the portable terminal 40.

Then, the display on the display unit 31 of the operating panel 30 of the image processing apparatus 10 and the acceptance of operations by the operating unit 32 are invalidated (step S306) and the process ends. By this, while a screen displayed on the operating panel 30 of the image processing apparatus 10 is displayed on the portable terminal 40, operations on the operating panel 30 of the image processing apparatus 10 are invalidated. Namely, an apparatus that functions to receive various types of operations for the image processing apparatus 10 is changed from the operating panel 30 of the image processing apparatus 10 to the portable terminal 40.

As such, in the case in which the approach reference is set as the automatic change condition, when the user moves the portable terminal 40 such that the portable terminal 40 and the operating panel 30 of the image processing apparatus 10 have a positional relationship where the distance between the portable terminal 40 and the operating panel 30 of the image processing apparatus 10 is shorter than that obtained before, a screen displayed on the portable terminal 40 is changed to a screen displayed on the operating panel 30 of the image processing apparatus 10.

Note that, when there are a plurality of image processing apparatuses 10 whose distances to the portable terminal 40 are shorter at step S303 of FIG. 6, an operation of selecting one of the plurality of image processing apparatuses 10 is accepted from the user. Then, the processes at steps S305 and S306 are performed targeting the selected image processing apparatus 10.

Figure 7:
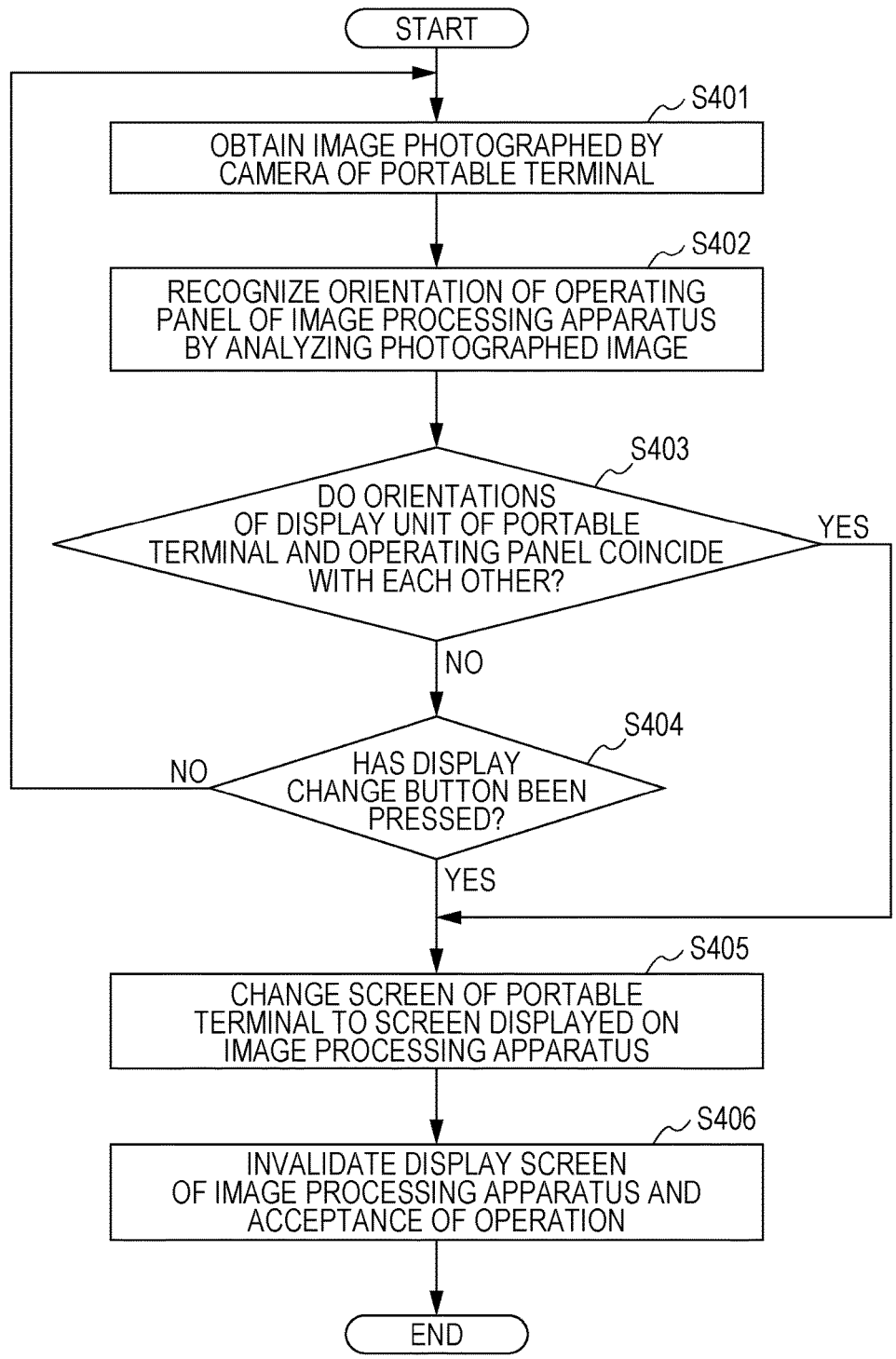
FIG. 7 is a flowchart showing the details of an orientation reference process (step S107 of FIG. 4)

FIG. 7 is a flowchart showing the details of the orientation reference process (step S107 of FIG. 4). An image that is currently photographed by the camera 45 of the portable terminal 40 is obtained (step S401). By analyzing the image, the orientation of the operating panel 30 of the image processing apparatus 10 in the image is recognized (step S402).

Then, it is checked whether the orientation of the display unit 48 of the portable terminal 40 coincides with the orientation of the operating panel 30 of the image processing apparatus 10 (step S403).

Here, if the difference between the orientation of the display unit 48 of the portable terminal 40 and the orientation of the operating panel 30 of the image processing apparatus 10 is less than or equal to a predetermined allowable value, it is determined that the orientations coincide with each other. The allowable value can be set to any value, but is set to, for example, 10 degrees to 20 degrees.

Note that the camera 45 of the portable terminal 40 takes a photograph in a direction in which the back side of the portable terminal 40 (the backside of the display unit 48) faces. Hence, if the orientation of the operating panel 30 of the image processing apparatus 10 in an image photographed by the camera 45 is found, then the difference between the orientation of the display unit 48 of the portable terminal 40 and the orientation of the operating panel 30 of the image processing apparatus 10 can be recognized.

A method of recognizing the difference between the orientation of the operating panel 30 of the image processing apparatus 10 and the orientation of the display unit 48 of the portable terminal 40 is not limited to a method of analyzing an image photographed by the camera 45. For example, information indicating the orientation of the image processing apparatus 10 may be obtained from the image processing apparatus 10 and the portable terminal 40 may recognize its orientation using the direction sensor unit 52 and then the difference therebetween may be recognized. The orientation of the image processing apparatus 10 may be, for example, measured by an installation worker or a manager and registered in the image processing apparatus 10.

If the orientation of the display unit 48 of the portable terminal 40 coincides with the orientation of the operating panel 30 of the image processing apparatus 10 (step S403:

Yes), processing transitions to step S405. Note that it may be determined to be "Yes" at step S403 when the state of the orientations coinciding with each other is maintained for a certain period of time or more (e.g., two seconds or more).

If the orientation of the display unit 48 of the portable terminal 40 does not coincide with the orientation of the operating panel 30 of the image processing apparatus 10 (step S403: No), it is determined whether the display change button has been pressed (step S404). If the display change button has not been pressed (step S404: No), processing returns to step S401 and the process continues. If the display change button has been pressed (step S404: Yes), processing transitions to step S405.

At step S405, a screen displayed on the portable terminal 40 is changed to a screen displayed on the display unit 31 of the operating panel 30 of the image processing apparatus 10. Here, the same screen as that displayed on the display unit 31 of the operating panel 30 at the present time is displayed on the display unit 48 of the portable terminal 40.

Then, the display on the display unit 31 of the operating panel 30 of the image processing apparatus 10 and the acceptance of operations by the operating unit 32 are invalidated (step S406) and the process ends. By this, while a screen displayed on the operating panel 30 of the image processing apparatus 10 is displayed on the portable terminal 40, operations on the operating panel 30 of the image processing apparatus 10 are invalidated. Namely, an apparatus that functions to receive various types of operations for the image processing apparatus 10 is changed from the operating panel 30 of the image processing apparatus 10 to the portable terminal 40.

As such, in the case in which the orientation reference is set as the automatic change condition, when the user moves the portable terminal 40 such that the portable terminal 40 and the operating panel 30 of the image processing apparatus 10 have a positional relationship where the orientation of the display unit 48 of the portable terminal 40 and the orientation of the operating panel 30 of the image processing apparatus 10 coincide with each other, a screen displayed on the portable terminal 40 is changed to a screen displayed on the operating panel 30 of the image processing apparatus 10.

Note that, when there are a plurality of image processing apparatuses 10 having operating panels whose orientations coincide with the orientation of the display unit 48 of the portable terminal 40 at step S403 of FIG. 7, an operation of selecting one of the plurality of image processing apparatuses 10 is accepted from the user. Then, the processes at steps S405 and S406 are performed targeting the selected image processing apparatus 10.

Figure 8:
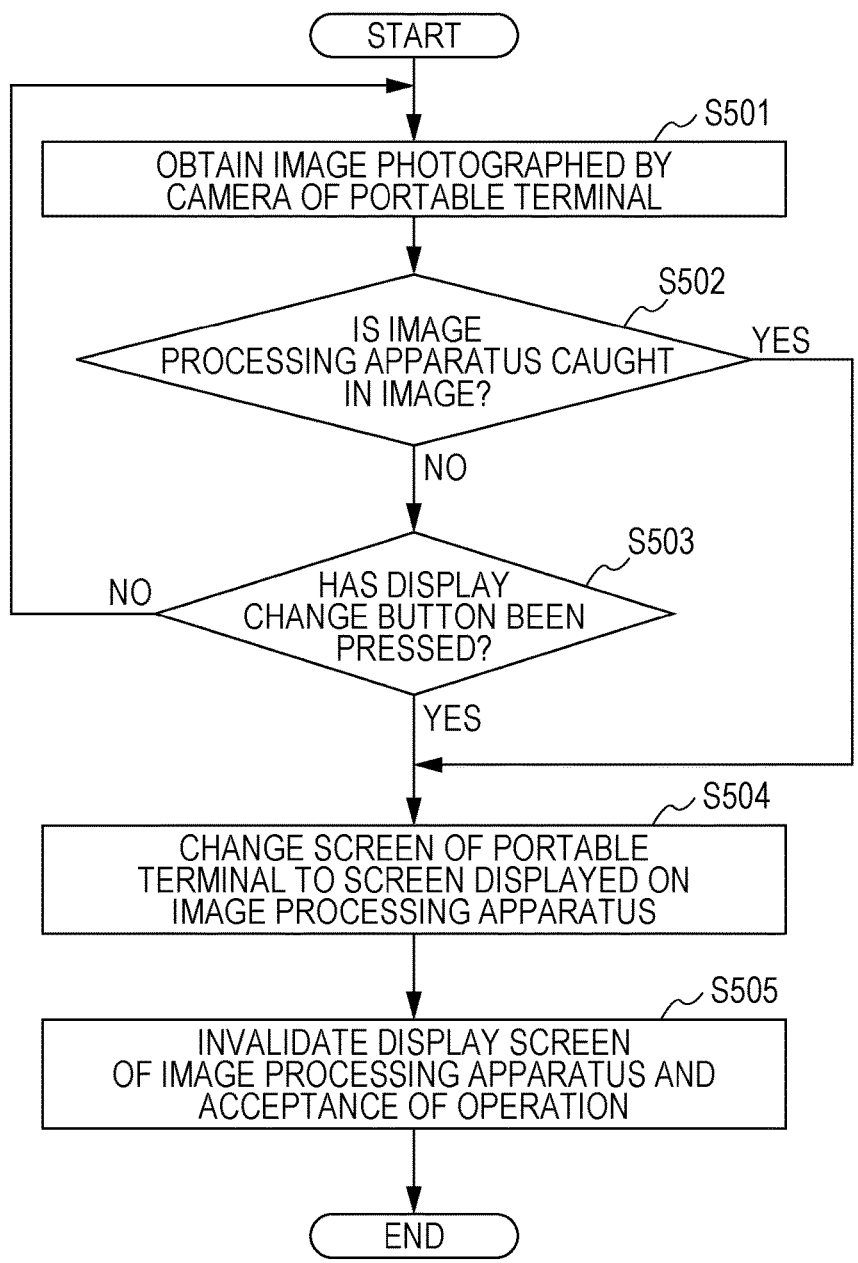
FIG. 8 is a flowchart showing the details of a photographed-image reference process (step S108 of FIG. 4)

FIG. 8 is a flowchart showing the details of the photographed-image reference process (step S108 of FIG. 4). An image that is currently photographed by the camera 45 of the portable terminal 40 is obtained (step S501). By analyzing the image, it is determined whether the operating panel 30 of the image processing apparatus 10 is caught in the image (step S502).

Note that here it is determined that the operating panel 30 of the image processing apparatus 10 is caught in the image, only when the size of the image processing apparatus 10 (or the operating panel 30 of the image processing apparatus 10) caught in the image is greater than or equal to a certain size, i.e., only when the operating panel 30 of the image processing apparatus 10 is caught in a range where the distance from the portable terminal 40 is within a predetermined distance.

If the image processing apparatus 10 is caught in the image photographed by the camera 45 of the portable terminal 40 (step S502: Yes), processing transitions to step S504. Note that it may be determined to be "Yes" at step S502 when the state of being caught is maintained for a certain period of time or more (e.g., two seconds or more). If the image processing apparatus 10 is not caught in the image photographed by the camera 45 of the portable terminal 40 (step S502: No), it is determined whether the display change button has been pressed (step S503). If the display change button has not been pressed (step S503: No), processing returns to step S501 and the process continues. If the display change button has been pressed (step S503: Yes), processing transitions to step S504.

At step S504, a screen displayed on the portable terminal 40 is changed to a screen displayed on the display unit 31 of the operating panel 30 of the image processing apparatus 10. Here, the same screen as that displayed on the display unit 31 of the operating panel 30 at the present time is displayed on the display unit 48 of the portable terminal 40.

Then, the display on the display unit 31 of the operating panel 30 of the image processing apparatus 10 and the acceptance of operations by the operating unit 32 are invalidated (step S505) and the process ends. By this, while a screen displayed on the operating panel 30 of the image processing apparatus 10 is displayed on the portable terminal 40, operations on the operating panel 30 of the image processing apparatus 10 are invalidated. Namely, an apparatus that functions to receive various types of operations for the image processing apparatus 10 is changed from the operating panel 30 of the image processing apparatus 10 to the portable terminal 40.

As such, in the case in which the photographed-image reference is set as the automatic change condition, when the user moves the portable terminal 40 such that the portable terminal 40 and the operating panel 30 of the image processing apparatus 10 have a positional relationship where the operating panel 30 of the image processing apparatus 10 is caught in an image photographed by the camera 45 of the portable terminal 40, a screen displayed on the portable terminal 40 is changed to a screen displayed on the operating panel 30 of the image processing apparatus 10.

When a plurality of image processing apparatuses 10 are caught in the image at step S502 of FIG. 8, an operation of selecting one of the plurality of image processing apparatuses 10 is accepted from the user. Then, the processes at steps S504 and S505 are performed targeting the selected image processing apparatus 10.

Figure 9:
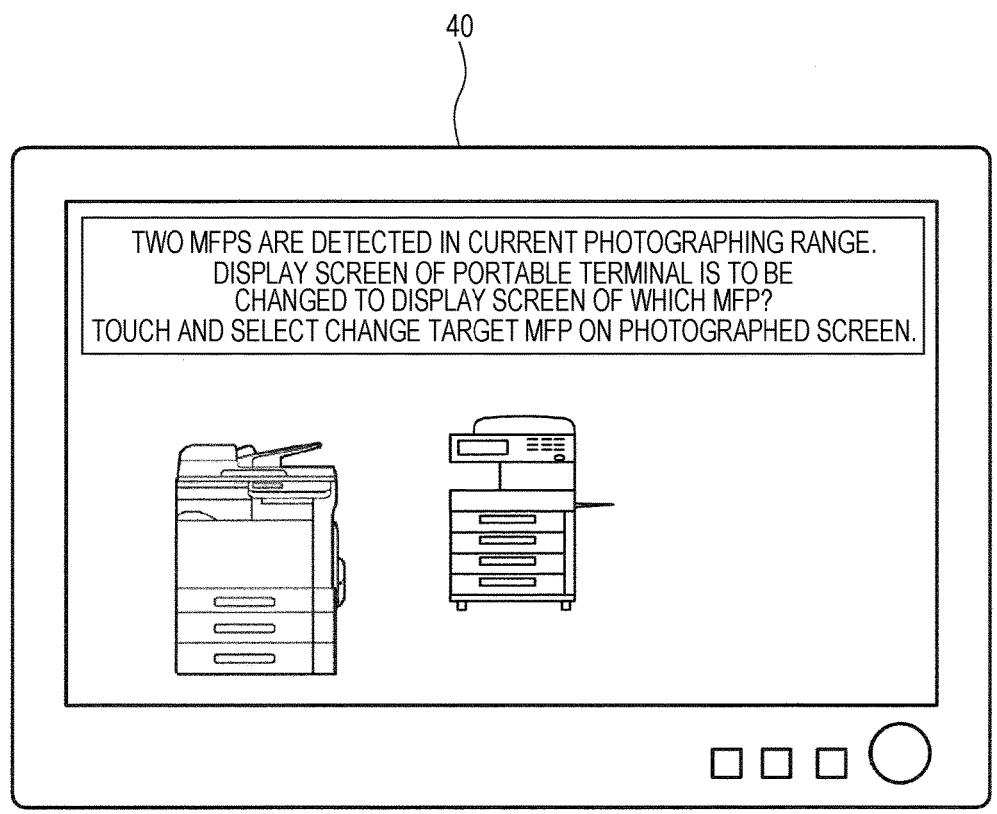
FIG. 9 is a diagram showing an example of a selection screen that accepts, from a user, an operation of selecting one of a plurality of image processing apparatuses.
Figure 10:
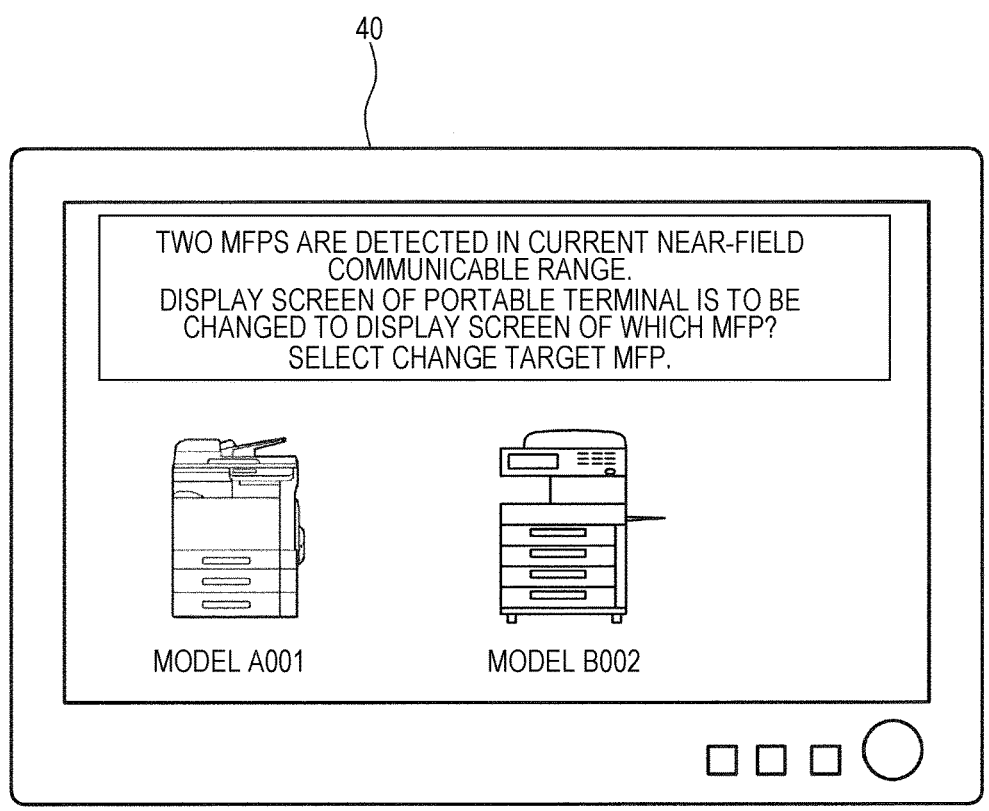
FIG. 10 is a diagram showing another example of a selection screen that accepts, from a user, an operation of selecting one of a plurality of image processing apparatuses.

FIGS. 9 and 10 show examples of a selection screen that accepts, from the user, an operation of selecting one of a plurality of image processing apparatuses 10 at step S202 of FIG. 5, step S303 of FIG. 6, step S403 of FIG. 7, and step S502 of FIG. 8. FIG. 9 shows a selection screen that accepts, from the user, selection of one of a plurality of image processing apparatuses when the plurality of image processing apparatuses are detected in a camera's photographing range. FIG. 10 shows a selection screen that accepts, from the user, selection of one of a plurality of image processing apparatuses when the plurality of image processing apparatuses are detected in a communicable range of near-field communication. The screens shown in FIGS. 9 and 10 are displayed on the portable terminal 40.

Note that, at S103 of FIG. 4, a display change cancel button may be displayed in addition to the display change button and when the cancel button is operated, the process may end without changing the screen. The process of displaying the cancel button and canceling a change of a screen when the cancel button is operated is performed by the invalidation instructing unit of the CPU 41.

The division of roles between the image processing apparatus 10 and the portable terminal 40 in the performance of the processes of FIGS. 4 to 8 may be determined as appropriate. For example, it may be determined whether the orientation of the display unit 48 of the portable terminal 40 and the orientation of the operating panel 30 of the image processing apparatus 10 coincide with each other, based on an image photographed by the camera 45 of the portable terminal 40 or based on an image photographed by the camera 34 of the image processing apparatus 10. In the latter case, by analyzing the image photographed by the camera 34 of the image processing apparatus 10, the orientation of the portable terminal 40 is recognized and then the difference between the orientation of the display unit 48 of the portable terminal 40 and the orientation of the operating panel 30 of the image processing apparatus 10 is recognized.

In addition, the processes shown in FIGS. 4 to 8 may be configured to be performed by, for example, the portable terminal 40 alone, instead of by the operation display system 5. Specifically, the portable terminal 40 determines whether the position of the portable terminal 40 has been changed such that the portable terminal 40 and the image processing apparatus 10 have a predetermined positional relationship, based on an image photographed by the camera 45 thereof or a result of detection by the direction sensor unit 52. If the change has been made, the portable terminal 40 changes a screen displayed on the display unit 48 thereof to a screen displayed on the operating panel 30 of the image processing apparatus 10. In this case, information on the screen displayed on the operating panel 30 of the image processing apparatus 10 may be obtained from the image processing apparatus 10 through wireless communication.

Furthermore, the configuration may be such that the image processing apparatus 10 performs almost all of the processes shown in FIGS. 4 to 8 and transmits a screen change instruction to the portable terminal 40. Specifically, the image processing apparatus 10 determines whether the position of the portable terminal 40 has been changed such that the portable terminal 40 and the image processing apparatus 10 have a predetermined positional relationship, by analyzing an image photographed by the camera 34 of the image processing apparatus 10. If it is determined that the change has been made, the image processing apparatus 10 transmits a screen change instruction to the portable terminal 40. At this time, the image processing apparatus 10 transmits information on a screen to be displayed after the change, to the portable terminal 40. The portable terminal 40 having received the instruction changes a screen displayed on the display unit 48 thereof, according to the instruction. Note that the image processing apparatus 10 instructs the portable terminal 40 to perform display of a display change button and a display change cancel button when inquiring the user about a change of a screen, and the portable terminal 40 transmits the operating statuses of the buttons to the image processing apparatus 10.

Although the embodiment of the present invention has been described above using the drawings, specific configurations are not limited to those described in the embodiment, and the present invention also includes changes and additions as fall within the spirit of the present invention.

Although in the embodiment an apparatus including an operating panel is the image processing apparatus 10, the apparatus is not limited thereto, and any apparatus including an operating panel may be used.

Although in the embodiment the fact that the portable terminal 40 and the image processing apparatus 10 can communicate with each other is treated as a precondition (step S102 of FIG. 4), this may be used as one automatic change condition. Specifically, when the position of the portable terminal 40 has been changed such that the portable terminal 40 and the image processing apparatus 10 have a positional relationship where they can perform wireless communication with each other, a screen displayed on the portable terminal 40 may be changed to a screen displayed on the operating panel 30 of the image processing apparatus 10.

In changing a screen, the entire screen does not need to be changed. On the side of the portable terminal 40, a screen of the image processing apparatus 10 may be displayed and a screen displayed on the side of the portable terminal 40 may also be displayed, e.g., the two screens may be scaled down and displayed side by side.

Although the embodiment shows an example in which in change operation, a screen displayed on the operating panel 30 of the image processing apparatus 10 at the present time is displayed on the display unit 48 of the portable terminal 40, for example, the image processing apparatus 10 may go into power saving mode and be placed in a state in which nothing is displayed on the operating panel 30. In this case, a screen displayed on the operating panel 30 of the image processing apparatus 10 when returning to a normal state from the power saving mode may be displayed on the portable terminal 40. At this time, the operating panel 30 of the image processing apparatus 10 may maintain the power saving mode.

In addition, the portable terminal 40 may be operated such that, if the predetermined positional relationship has been detected when the portable terminal 40 is in a power saving state, the power saving state is canceled and a screen of the image processing apparatus 10 is displayed on the portable terminal 40.

Although in the embodiment the display and acceptance of operations on the operating panel 30 of the image processing apparatus 10 are invalidated while a screen displayed on the portable terminal 40 is changed to a screen displayed on the operating panel 30 of the image processing apparatus 10, the display and acceptance of operations on the operating panel 30 of the image processing apparatus 10 may be maintained in a valid state.

When steps S401 to S404 of FIG. 7 are performed, an image photographed by the camera 45 is not displayed on the display unit 48 of the portable terminal 40. Namely, in FIG. 7, the camera 45 of the portable terminal 40 operates in the background instead of a mode where the user uses the camera 45. On the other hand, when steps S501 to S503 of FIG. 8 are performed, an image photographed by the camera 45 is displayed on the display unit 48 of the portable terminal 40. Namely, in FIG. 8, the portable terminal 40 operates in photographing mode where the user uses the camera 45. These are preferred examples and in both of FIGS. 7 and 8 the camera 45 may be allowed to operate in the background or may be allowed to operate in photographing mode.

According to a portable terminal, a program therefor, an apparatus, and an operation display system according to an embodiment of the present invention, a screen displayed on the portable terminal can be easily changed to a screen displayed on an operating panel of another apparatus.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A portable terminal comprising:
   a display;
   an operating unit;
   communication hardware for communicating with a predetermined other apparatus;
   a camera; and
   a hardware processor configured to compute a position of the portable terminal and change a screen displayed on the display of the portable terminal to a screen corresponding to a screen displayed on an operating panel of the predetermined other apparatus, when the hardware processor computes that the position of the portable terminal and a position of the predetermined other apparatus have a predetermined positional relationship that an orientation of the display is the same as an orientation of the operating panel of the predetermined other apparatus,
   wherein the orientation of the operating panel of the predetermined other apparatus is recognized by the portable terminal based on an image taken by the camera, the image being of the operating panel of the predetermined other apparatus,
   wherein the hardware processor computes a difference between the orientation of the display and the orientation of the operating panel of the predetermined other apparatus recognized from the image and uses the computed difference to determine that the orientation of the display is the same as the orientation of the operating panel of the predetermined other apparatus.

2. The portable terminal according to claim 1, wherein hardware processor changes the screen when the hardware processor computes that the predetermined positional relationship is maintained for a certain period of time.

3. The portable terminal according to claim 1, wherein, when the hardware processor computes the predetermined positional relationship, the hardware processor checks with a user whether to change the screen, and changes the screen when the hardware processor receives an instruction to change the screen.

4. The portable terminal according to claim 1, wherein the hardware processor is further configured to instruct the predetermined other apparatus to invalidate acceptance of an operation on the operating panel while the screen displayed on the operating panel of the predetermined other apparatus is displayed on the display of the portable terminal.

5. The portable terminal according to claim 1, wherein, when there are a plurality of predetermined other apparatuses that satisfy the predetermined positional relationship, an operation of selecting one of the plurality of predetermined other apparatuses is accepted, and the screen displayed on the display of the portable terminal is changed to a screen displayed on an operating panel of the apparatus selected by the operation.

6. A non-transitory recording medium storing a computer readable program for causing an information processing apparatus to function as the portable terminal according to claim 1.

7. An operation display system comprising:
   a portable terminal including a camera;
   an apparatus including an operating panel;
   communication hardware for communication between the portable terminal and the apparatus; and
   a hardware processor configured to compute a position of the portable terminal relative to the apparatus and change a screen displayed on a display of the portable terminal to a screen displayed on the operating panel of the apparatus when the hardware processor computes that a position of the apparatus and the position of the portable terminal have a predetermined positional relationship that an orientation of the operating panel is the same as an orientation of the display of the portable terminal,
   wherein the orientation of the operating panel of the apparatus is recognized by the portable terminal based on an image taken by the camera, the image being of the operating panel of the apparatus,
   wherein the hardware processor computes a difference between the orientation of the display and the orientation of the operating panel of the apparatus recognized from the image and uses the computed difference to determine that the orientation of the display is the same as the orientation of the operating panel of the apparatus.

8. The operation display system according to claim 7, wherein the hardware processor changes the screen when the hardware processor computes that the predetermined positional relationship is maintained for a certain period of time.

9. The operation display system according to claim 7, wherein, when the hardware processor computes the predetermined positional relationship, the hardware processor checks with a user whether to change the screen, and changes the screen when the hardware processor receives an instruction to change the screen.

10. The operation display system according to claim 7, wherein acceptance of an operation on the operating panel is invalidated while the screen displayed on the display of the portable terminal is changed to the screen corresponding to the screen displayed on the operating panel of the apparatus.

11. The operation display system according to claim 7, wherein, when there are a plurality of apparatuses that satisfy the predetermined positional relationship, an operation of selecting one of the plurality of apparatuses is accepted, and the screen displayed on the display of the portable terminal is changed to a screen displayed on an operating panel of the apparatus selected by the operation.

* * * * *